US012145885B2

(12) United States Patent
Dietz et al.

(10) Patent No.: US 12,145,885 B2
(45) Date of Patent: Nov. 19, 2024

(54) COMPOSITION FOR A POWDER MORTAR AND A POWDER MORTAR, IN PARTICULAR FOR USE AS A SPACKLING COMPOUND

(71) Applicant: KNAUF GIPS KG, Iphofen (DE)

(72) Inventors: Stephan Dietz, Pretzfeld (DE);
Sebastian Förthner, Furth (DE);
Claus-Peter Berneth, Marktbreit (DE);
Manfred Baier, Iphofen-Nenzenheim (DE); Achim Meier, Iphofen (DE);
Linda Keppler, Iphofen (DE); Anne Rückel, Volkach (DE)

(73) Assignee: KNAUF GIPS KG, Iphofen (DE)

( * ) Notice: Subject to any disclaimer, the term of this patent is extended or adjusted under 35 U.S.C. 154(b) by 1017 days.

(21) Appl. No.: 17/050,137

(22) PCT Filed: Jan. 17, 2019

(86) PCT No.: PCT/EP2019/000016
§ 371 (c)(1),
(2) Date: Oct. 23, 2020

(87) PCT Pub. No.: WO2019/206444
PCT Pub. Date: Oct. 31, 2019

(65) Prior Publication Data
US 2021/0230064 A1    Jul. 29, 2021

(30) Foreign Application Priority Data
Apr. 27, 2018  (EP) .................................... 18000402

(51) Int. Cl.
C04B 26/28 (2006.01)
C04B 26/04 (2006.01)
C04B 28/14 (2006.01)
C04B 40/06 (2006.01)
C04B 14/28 (2006.01)
C04B 111/72 (2006.01)

(52) U.S. Cl.
CPC .............. *C04B 26/28* (2013.01); *C04B 26/04* (2013.01); *C04B 28/14* (2013.01); *C04B 40/0608* (2013.01); *C04B 14/28* (2013.01); *C04B 2111/72* (2013.01)

(58) Field of Classification Search
CPC ......... C04B 26/28; C04B 26/04; C04B 28/14; C04B 40/0608; C04B 14/28; C04B 2111/72
USPC ................................................... 106/162.81
See application file for complete search history.

(56) References Cited

U.S. PATENT DOCUMENTS

| 4,654,085 | A |   | 3/1987  | Schinski |       |
|-----------|---|---|---------|----------|-------|
| 5,575,840 | A | * | 11/1996 | DeWacker | C08L 1/28 |
|           |   |   |         |          | 536/84 |
| 5,679,145 | A |   | 10/1997 | Andersen et al. | |
| 6,168,857 | B1 | * | 1/2001 | Andersen | B29C 71/0009 |
|           |   |   |         |          | 428/297.4 |
| 6,943,247 | B2 |   | 9/2005  | Kiesewetter et al. | |
| 2005/0235878 | A1 | * | 10/2005 | Podlas | B63H 3/008 |
|           |   |   |         |          | 106/618 |
| 2012/0225978 | A1 | * | 9/2012 | Kruger | D06M 15/00 |
|           |   |   |         |          | 524/53 |
| 2015/0232785 | A1 | * | 8/2015 | Paullin | C11D 3/222 |
|           |   |   |         |          | 536/120 |

FOREIGN PATENT DOCUMENTS

| AU | 2006-201742 A1 | 1/2007 | |
| CN | 101549966 A | 10/2009 | |
| CN | 107082599 A * | 8/2017 | |
| DE | 10-217-503 A1 | 11/2003 | |
| EP | 0816299 A1 | 1/1998 | |
| EP | 2942336 A1 | 11/2015 | |
| EP | 3216770 A1 | 9/2017 | |
| FR | 2949784 A1 | 3/2011 | |
| JP | 2000-219554 A | 8/2000 | |
| JP | 2005-272202 A | 10/2005 | |
| JP | 2011-132041 A | 7/2011 | |
| KR | 10-1761778 B1 | 7/2017 | |
| RU | 2275342 C2 | 4/2006 | |
| RU | 2307809 C1 | 10/2007 | |
| WO | WO-9502614 A1 * | 1/1995 | ............... B22C 1/26 |
| WO | 2012-034404 A1 | 3/2012 | |
| WO | WO-2013131584 A1 * | 9/2013 | ............ B01F 23/511 |
| WO | 2017-212044 A1 | 12/2017 | |

(Continued)

OTHER PUBLICATIONS

Starch based thickening agents for personal care and surfactant systems A. Lehmann et al Colloids and Surfaces A: Physicochemical and Engineering Aspects, V331, pp. 150-154 (Year: 2008).*
WO-9502614-A1, English translation (Year: 1995).*
WO 2013131584, English translation (Year: 2013).*
CN-107082599-A, 2017, English translation (Year: 2017).*
Office Action from corresponding Russian Patent Application No. 202091801 dated Apr. 22, 2022.
Office Action from corresponding Japanese Patent Application No. 2020-555027 dated Jan. 10, 2023.
International Search Report for co-pending European Patent Application No. PCT/EP2019/000016 dated Apr. 2, 2019.
Office Action from corresponding European Patent Application No. 19 701 437.6 dated Nov. 21, 2022.

(Continued)

*Primary Examiner* — Stefanie J Cohen
(74) *Attorney, Agent, or Firm* — Christensen, Fonder, Dardi PLLC; Diane E. Bennett; Peter S. Dardi

(57) ABSTRACT

The invention relates to a composition for a powder mortar comprising one or more fillers, one or more binders, one or more thickeners and optionally further additives, wherein at least one of the one or more binders comprises a starch, and wherein at least one of the one or more thickeners is an etherified starch. The invention further relates to a corresponding powder mortar, in particular for use as a spackling compound.

20 Claims, No Drawings

(56) References Cited

FOREIGN PATENT DOCUMENTS

WO    2018-011178 A1    1/2018

OTHER PUBLICATIONS

Echemi, "Starch, 2-hydroxy-3-(trimethylammonio)propyl ether, chloride", [screen shot from site: https://www.echemi.com/products/pd180727156979-cationic-starch.html], (Feb. 9, 2024).
Glatthor, "Performance of Starch Ethers in Drymix Mortars", ResearchGate: Conference MixBuild 2016, (Dec. 2016).
Li et al., "Recent progress in chemical modification of starch and its applications" Royal Society of Chemistry Advances, vol. 5, p. 67459-67474, (Aug. 2015).
Lutz et al., "Dry Mortars", Wiley-VCH Verlag GmbH & Co. KGaA, p. 541-579, (2012).
Mallon, "Bauchemie" Vogel Buchverlag, p. 156-164, (2005).
Notice of Opposition from corresponding European Patent Application No. 19701437.6 dated Mar. 7, 2024.

* cited by examiner

COMPOSITION FOR A POWDER MORTAR AND A POWDER MORTAR, IN PARTICULAR FOR USE AS A SPACKLING COMPOUND

This application is a National Stage filing of PCT Application No. PCT/EP2019/000016 filed Jan. 17, 2019, entitled "COMPOSITION FOR A POWDER MORTAR AND A POWDER MORTAR, IN PARTICULAR FOR USE AS A SPACKLING COMPOUND", which claims priority to European Patent Application No. 18000402.0 filed Apr. 27, 2018, both of which are incorporated herein by reference.

The invention relates to a composition for a powder mortar and a powder mortar, in particular for use as a spackling compound.

In prior art, two systems of mortars are known, powder mortars and pasty mortars. They are known for filling joints or for being applied to surfaces, such as walls, in order to smooth out any unevenness and to additionally function as primer layer for another layer to be applied thereon. Powder mortars (or powder fillers) have for example the advantage that they can be transported more easily to the place where they are used, because they do not contain water yet, further they can be stored over months without their processing characteristics being modified or deteriorated.

Mortars include generally at least one binding component (or binder) and at least one filler, while often other additives are included. The binders have the function to bind the components of the filler material and to bond adhesively the filler to the substrate, like a wall or the like. In the state of the art, different classes of binders exist, for example mineral binders like for example cement, calcium sulfate hemihydrate or lime, or organic polymer binders like for example polyvinyl acetate, polyethylene vinyl acetate, polyacrylate or polyvinyl alcohol.

However, the above mentioned organic polymer binders (also known as dispersion powders) are rather expensive not an environmentally sustainable resource.

Compared to dispersion powders like polyvinyl acetate, starch as organic binder on the other hand has the advantage that it is cost-efficient to produce and is a renewable and environmentally sustainable resource.

Starch (or amylum) is usually composed of two different polysaccharides, amylose and amylopectin, wherein amylopectin is much bigger compared to amylose, but they are both composed of alpha-D-glucose units. The difference is that the amylopectin is composed of alpha-D-glucose units joined by 1-4- and 1-6-glycosodic bonds, while amylose is composed of alpha-D-glucose units joined exclusively by 1-4-glycosodic bonds. Thus, amylopectin is much more branched than amylose and therefore the much larger molecule in starch. Usually the amount by weight of amylopectin is at least double compared to the amount by weight amylose in starch (for example 70% by weight of amylopectin to 30% by weight of amylose). However, this can vary in different starches. There are even starches, which are cultivated plant varieties that have mainly amylopectin starch without amylose, known as waxy starches. In general, starch can be obtained from different plants (potato, corn, wheat, rice, cassava root (tapioca), peas and others) and therefore has different properties (starting with different amylose/amylopectin ratios). Moreover, starch can be used as non-modified native starch or being modified in different ways (for example physical, chemical or enzymatic).

According to physical modification, there are for example, are but not limited to, pregelatinized starch, extruded starch, spray-cooked starch, spray-dried starch, drum-dried starch, or annealed starch, or any combination thereof. Different modifications of the starch result, of course, in different properties of the starch, like for example a cold-water-soluble starch or a cold-water-swellable (CWS) starch.

On the other side chemical modifications of starches at their available hydroxyl groups can result for example, are but not limited to, in oxidized starches, crosslinked starches, etherified starches or esterified starches, or any combination thereof.

However, at least after etherification and esterification starches are usually not considered as binders. Thus, it has to be noted that in the present invention etherified and esterified starches are not classified as binders but as thickeners, since their properties make them more useful as thickener than as binder.

However, it has to be noted that even an etherified starch may be further modified, resulting in, but not limited to, for example a pregelatinized etherified starch, an extruded etherified starch, a spray-cooked etherified starch, spray-dried etherified starch, drum-dried etherified starch, cold-water-soluble etherified starch, cold-water-swellable (CWS) etherified starch, an annealed etherified starch oxidized etherified starch, a crosslinked etherified starch, or esterified etherified starch or any combination thereof. In any way, there is no preference which modification has to be carried out first. Moreover, it is also possible that some modifications are carried out at the same time.

Powder mortars are often used as spackling compound or joint filler (after addition of water at the building site). Other names for spackling compound are for example "spackling paste" or "joint and finish compound". Further, powder mortars can be used for screed, putty or plasterwork, or to bind building blocks such as stones, bricks, and concrete masonry units together or to fill and seal the irregular gaps between them.

Further, powder mortar compositions, in particular for use as a spackling paste, should have the function to level unevenness of surfaces to provide a homogeneous surface for further coatings. They should further have a good workability, only very little abrasion, good adhesive tensile strength, providing a good adhesion for a joint tape or paper tape, a good mixing behavior and a comfortable working consistency.

In general, there is a trend to use cost-efficient, renewable and environmentally sustainable resources, and there is a need to find mortar compositions, which are more cost-efficient to produce, that need less or less amounts of additives and have enhanced properties, especially the properties mentioned above.

Thus, it is an object of the present invention to provide a mortar composition that is more cost-efficient to produce, needs less or less amounts of additives, has enhanced properties and contains renewable and environmentally sustainable resources. It is also an object of the present invention to provide a corresponding powder mortar, in particular for use as a spackling paste.

The object of the present invention is solved by a composition comprising one or more fillers, one or more binders and one or more thickeners and optionally further additives, wherein at least one of the one or more binders is a starch, and wherein at least one of the one or more thickeners is an etherified starch. Preferred embodiments of the invention are defined in the respective dependent claims.

Surprisingly, it has been found that the substitution of a dispersion powder with starch in combination with an etherified starch in a powder mortar leads to enhanced properties of the mortar. Especially surprising was the very little amount of etherified starch needed for this effect.

Further, using starch as well as etherified starch is advantageous in a global way since it is following the general trend to use cost-efficient, renewable and environmentally sustainable resources.

As filler materials, nodular and lamellar materials are used which usually are of mineral origin. The filler particles form the framework or skeleton of the coating and, thus, contribute to the layer thickness and sink characteristics depending on the amount of filler material added.

The one or more fillers may be calcium carbonates, calcium magnesium carbonates (dolomite), calcium sulfates, perlite, expanded perlite, magnesium carbonate, glass, mica and resin microbeads, or any combination thereof, preferably calcium carbonates and/or calcium magnesium carbonates.

The calcium sulfates used as fillers according to the invention should be understood as gypsum or anhydrite (dead burned).

The one or more fillers according to the present invention may in present in the composition in an amount of from more than 90,0% by weight to less than 99,5% by weight of the total composition, preferably from more 92,0% by weight to less than 99,0% by weight of the total composition, more preferably of from 94,0% by weight to 98,5% by weight of the total composition.

At least one of the one or more binder is a starch. Examples of suitable starches include but are not limited to, a potato starch, a wheat starch, a rice starch, a corn starch, a tapioca starch, a pea starch or any combinations thereof, preferably a wheat starch and/or a potato starch or any combinations thereof.

In some preferred embodiments the starch can be a native starch, a pregelatinized starch, an extruded starch, a spray-cooked starch, a spray-dried starch, a drum-dried starch, a cold-water-soluble starch, a cold-water-swellable starch, an annealed starch, an oxidized starch, a crosslinked starch, an esterified starch or a non-modified native starch, preferably a pregelatinized starch, a cold-water-swellable starch, an oxidized starch or a native starch.

However, in some preferred embodiments some combinations are possible. For example, a pregelatinized starch according to some embodiments of the invention can be a pregelatinized, cold-water-swellable wheat starch (e.g. Foodgel by Kröner-Stärke GmbH). Other examples for such starches are, but not limited to, cold-water-swellable wheat starch (e.g. Allstarch Quellstar CWS 10 by Interstarch GmbH), pregelatinized, native, cold-water-swellable potato starch (Pregeflo P 100 G by Roquette) or pregelatinized, cold-water-swellable wheat starch (e.g. Lightec by Kröner-Stärke GmbH).

On the other hand, for example, a native starch that is as well an esterified starch is not possible, because after esterification the starch is not native anymore. However, it has to be noted that, for example, a pregelatinized starch or a cold-water-swellable starch is still considered to be a native starch according to the present invention. The person skilled in the art is generally familiar with the mentioned modifications of starches.

Accordingly, the at least one of the one or more binder may be a native, pregelatinized starch, an oxidized starch or a pregelatinized starch, preferably a native, pregelatinized wheat starch, a native pregelatinized, cold-water-swellable starch, an oxidized, cold-water-swellable wheat starch, or a pregelatinized, cold-water-swellable wheatstarch.

Further, in some preferred embodiments in the composition the starch may be present in an amount of from more than 0,5% by weight to less than 7% by weight of the total composition, preferably more than 0,6% by weight to less than 5% by weight of the total composition, more preferably more than 0,7% by weight to less than 3% by weight of the total composition.

Since as described above starch is built up of polysaccarides, in some preferred embodiments the composition may comprise one or more polysaccharides having an average molecular weight Mw of between 15.000 g/mol and 200.000.000 g/mol, preferably between 20.000 g/mol and 150.000.000 g/mol, more preferably between 30.000 g/mol and 100.000.000 g/mol, and most preferably between 50.000 g/mol and 50.000.000 g/mol.

However, further binders are possible in addition to a starch binder. These further binders may be for example mineral binders or organic binders.

Thus, it may be possible according to the invention that the inventive composition comprises at least two binders, wherein the at least two binders are a starch and a further binder, wherein the further binder is a mineral binder or an organic binder.

Further binders that are mineral binders may be for example cement, calcium sulfate hemihydrate or lime.

Further binders that are organic binders may be for example a further starch, polyvinyl acetate, polyethylene vinyl acetate, polyacrylate or polyvinyl alcohol, preferably polyvinyl acetate or polyethylene vinyl acetate. Examples for such an additional binder may be Vinnapas 5043 N or Vinnapas 5044 N (both by Wacker).

The further starch may be defined as anyone of the starches as defined above.

However, preferred binders according to the present invention are organic binders.

Thus, a composition according to the present invention may comprise at least two binders, wherein the at least two binders are a starch and a further organic binder selected from the group consisting of a further starch, polyvinyl acetate, polyethylene vinyl acetate, polyacrylate and polyvinyl alcohol, preferably polyvinyl acetate or polyethylene vinyl acetate.

Further, it may also be possible according to the invention that the composition comprises three binders, for example a starch, calcium sulfate hemihydrate and an organic binder selected from polyvinyl acetate, polyethylene vinyl acetate, polyacrylate or polyvinyl alcohol, preferably polyvinyl acetate or polyethylene vinyl acetate.

Further, at least one of the one or more thickeners is an etherified starch. The etherified starch may be a potato etherified starch, a wheat etherified starch, a rice etherified starch, a corn etherified starch, a tapioca etherified starch, a pea etherified starch or any combinations thereof, preferably a wheat etherified starch and/or a potato etherified starch or any combinations thereof.

Advantageously, etherified starches have a yield value, so that they stick to the wall and do not come down after time due to gravity.

To obtain an etherified starch in some embodiments an etherification may be carried out. Thus the etherified starch may be etherified with sodium-monochloroacetate or alkylene oxides with the general formula $C_nH_{2n}O$, where n=2 to 5, preferably with propylenoxide (which equals to $C_nH_{2n}O$ wherein n=3).

Further, in some embodiments, the etherified starch may be a pregelatinized etherified starch, an extruded etherified starch, a spray-cooked etherified starch, a spray-dried etherified starch, a drum-dried etherified starch, a cold-water-soluble etherified starch, a cold-water-swellable etherified starch, an annealed etherified starch, an oxidized etherified starch, a crosslinked etherified starch, or an esterified etherified starch, preferably a pregelatinized etherified starch or a crosslinked etherified starch.

For example, a etherified starch according to some embodiments of the invention can be a pregelatinized, crosslinked potato etherified starch (e.g. Solvitose ZPF by Avebe). Other examples for such etherified starches are, but not limited to, Lyckelit H 3 (by Lyckeby), Norstar E 7 (by Nordmann Rassmann), Opagel CMT (by Avebe), Opagel FP 6 (by Avebe), Opagel GPX (by Avebe), Solvitose C 5 F (by Avebe), Solvitose FC 50 (by Avebe), Solvitose H 2060 (by Avebe), Starpol 136 (by Staley/Amylum), Starpol 468 (by Staley/Amylum), Tylovis SE 7 (by SE Tylose), Amylotex 8100 (by Hercules), Amylotex 8100 P (by Hercules), Amylotex ST 2000 (by Hercules), Amylotex ST 2100 (by Hercules), Amitrolit 8850 (by Agrana), Berolan ST 500 (by Berolan), Casucol 301 (by Avebe), Eloset 5400 (by Elotex) and Eloset 5420 (by Elotex).

Accordingly, the least one of the one or more thickeners may be a pregelatinized etherified starch, preferably a pregelatinized, crosslinked etherified starch, more preferably a pregelatinized, crosslinked potato etherified starch.

Further, in some embodiments of the invention the etherified starch may be present in the composition in an amount of from more than 0,01% by weight to less than 5% by weight of the total composition, preferably more than 0,02% by weight to less than 4% by weight of the total composition, more preferably more than 0,03% by weight to less than 3% by weight of the total composition, most preferably more than 0,04% by weight to less than 2% by weight of the total composition.

In some embodiments, at least two thickeners are present in the composition according to the invention. These two thickeners may be an etherified starch and a further thickener selected from the group consisting of cellulosic ether, cellulose-based gum, methyl cellulose, hydroxyethyl cellulose, hydroxyethylmethyl cellulose, dextran, carboxymethyl dextran, dextran-sulfonate salt, chitosan, xanthan gum, carboxymethyl cellulose or a salt thereof, carrageenan, hydroxyethyl hydroxypropyl cellulose, ethyl hydroxyethyl cellulose, hydroxypropylmethyl cellulose, and methylhydroxylpropyl cellulose, polyacrylamide, polyacrylamide copolymer, ethylene maleic anhydride copolymer, crosslinked carboxy-methylcellulose, polyvinyl alcohol copolymers, cross-linked polyethylene oxide or an esterified starch preferably cellulosic ether or polyacrylamide.

In some embodiments, at least three thickeners are present in the composition according to the invention. These three thickeners may be an etherified starch and two further thickeners selected from the group consisting of cellulosic ether, cellulose-based gum, methyl cellulose, hydroxyethyl cellulose, hydroxyethylmethyl cellulose, dextran, carboxymethyl dextran, dextran-sulfonate salt, chitosan, xanthan gum, carboxymethyl cellulose or a salt thereof, carrageenan, hydroxyethyl hydroxypropyl cellulose, ethyl hydroxyethyl cellulose, hydroxypropylmethyl cellulose, and methylhydroxylpropyl cellulose, polyacrylamide, polyacrylamide copolymer, ethylene maleic anhydride copolymer, cross-linked carboxy-methylcellulose, polyvinyl alcohol copolymers, cross-linked polyethylene oxide or an esterified starch preferably cellulosic ether and polyacrylamide.

Examples for suitable thickeners may be, but not limited to, Bermocoll E 431 X, (cellulosic ether by Akzo Nobel Chemicals AG) or Agocel S 2000 (polyacrylamide by CHT Germany GmbH).

The composition according to the invention may comprise further additives. As further additives, the composition according to the invention may comprise fungicides and/or biocides. Biocides are added in order to prevent bacterial contamination, and finally, fungicides are added for preventing fungal infestation.

Preferred biocides may be on the basis of 2-methyl-2H-isothiazoline-3-on (MIT) and 2-bromo-2-nitropopane-1.3-diol (BNPD) and preferred fungicides may be on the basis of isopropynyl butylcarbamate (IPBC).

Preferably, the composition may comprise 0.1 to 1% by weight of the total composition of biocides and/or 0,01 to 0,03% by weight of the total composition of fungicides.

In a very preferred embodiment of the invention, the composition according to the invention may comprise a filler, a starch, an etherified starch and a cellulosic ether and optionally a dispersion powder and/or polyacrylamide.

It is also an object of the present invention to provide a powder mortar, in particular for use as a spackling paste, which is prepared from the composition according to the invention.

It is further another object of the present invention to provide the use of such a powder mortar in building constructions, preferably in drywall constructions.

The following examples further illustrate the invention, but should not be construed in any way limiting its scope.

EXAMPLES

Examples are prepared showing the effect in properties of the inventing composition.

All examples (V) are prepared by mixing water with the composition in a "kitchen aid" mixing machine in a weight ratio of 0,48:1.

The interspersing is carried out in about 15 seconds, while some soft mixing with a shovel is done. After waiting for 60 seconds, the mixture is mixed for 30 seconds on level 1 of the mixing machine, followed by 5 seconds on level 2 and finally followed by 25 seconds again on level 1. After a relaxing time for the mixture of 180 seconds, another mixing of 30 seconds on level 1 is followed.

The different mixtures are shown in table 1. Examples V0, V0-1, V0-2, V1 and V2 are comparison examples. V0 only comprises dispersion powder, but no starch or etherified starch. V0-1 and V0-2 comprise only comprise dispersion powder and etherified starch but no starch. V1 and V2 comprise starch but no etherified starch.

Examples V1-1, V1-2 V2-1 and V2-2 are inventive since they comprise starch and etherified starch.

TABLE 1

| Example No. | Filler: Microdol A 250 | Binder | Thickener 1: Solvitose ZPF | Thickener 2: Bermocoll E 431 X | Thickener 3: Agocel S 2000 |
|---|---|---|---|---|---|
| V0 | 1000.00 g | Vinnapas 5043N: 25.00 g | — | 4.00 g | 0.22 g |
| V 0-1 | 1000.00 g | Vinnapas 5043N: 25.00 g | 0.5 g | 4.00 g | 0.22 g |
| V 0-2 | 1000.00 g | Vinnapas 5043N: 25.00 g | 1.00 g | 4.00 g | 0.22 g |

TABLE 1-continued

| Example No. | Filler: Microdol A 250 | Binder | Thickener 1: Solvitose ZPF | Thickener 2: Bermocoll E 431 X | Thickener 3: Agocel S 2000 |
|---|---|---|---|---|---|
| V1 | 1000.00 g | Quellstar CWS 10: 25.00 g | — | 4.00 g | 0.22 g |
| V 1-1 | 1000.00 g | Quellstar CWS 10: 25.00 g | 0.5 g | 4.00 g | 0.22 g |
| V 1-2 | 1000.00 g | Quellstar CWS 10: 25.00 g | 1.00 g | 4.00 g | 0.22 g |
| V 2 | 1000.00 g | Pregeflo P 100 G: 25.00 g | — | 4.00 g | 0.22 g |
| V 2-1 | 1000.00 g | Pregeflo P 100 G: 25.00 g | 0.5 g | 4.00 g | 0.22 g |
| V 2-2 | 1000.00 g | Pregeflo P 100 G: 25.00 g | 1.00 g | 4.00 g | 0.22 g |

Table 2 shows the results.

Abrasion is tested by bringing up the mixture as prepared with a thickness of about 2 mm on a defined piece of a gypsum board. After drying at room temperature until constant weight (usually 3 days) the piece is weighed and put into an abrasion machine (Taber-Abraser Modell 503) and is rotated 100 times with 60 rotations per minute and sandpaper S 33 and 500 g of check weight. After that, the weight of the piece is checked again and the difference is the abrasion.

Adhesion is tested by bringing up the mixture as prepared with a thickness of about 2 mm on a gypsum board. Afterwards two tapes (paper or "Kurt") are placed in the mixture in that way that about 5 cm of the tape are over the edge of the gypsum board. Then it is overdrawn twice with a putty knife. After drying for about 48 hours at room climate the tape is connected to a bucket that is slowly filled with water until the tape cracks off. Then the bucket with the water is weighed. Since there are two tapes the average is calculated.

Adhesive tensile strength is the stress in N/mm$^2$ required to rip off a test surface (test disc) glued to a defined surface (substrate) by tensile stress perpendicular to it. As substrate a gypsum plasterboard is used. Two rails with a thickness of 1.5 mm are to be arranged at a distance of about 20 cm on the plasterboard and are attached with an adhesive tape. The mixture is filled in evenly, without air bubbles and excess material is leveled on the rails with a spatula or putty knife. After complete drying (about 48 hours of room climate) a test disc is full-faced glued to the dried mixture with two-component adhesive, followed by inserting a screw into the test disc. Then a wooden plate with a cavity in the form of the test disc is put onto the substrate in that way that the test disc lies in the cavity. After that, the measuring device (Sattec) is put on the wooden plate and a perpendicular connection with the screw is established. Then the crank of the measuring device is turned until the crack occurs. While turning the crank, the force has to rise constantly about 50+/−5 N/s. The adhesive tensile strength is then calculated by dividing the measured force with the square of the radius x □ of the test disc (here: 1963 mm$^2$, since the radius of the disc is 25 mm).

According to abrasion, it has to be said that a smaller value (in g) is better, since then the composition is harder to destroy. According to the adhesions it has to be said that a higher value is better, since that is significant for a stronger connection of the composition with the respective tape. "Kurt" is a special tape by Knauf. According to the adhesive tensile strength, it has to be said that again a higher value is better, since that is significant for a stronger connection of the mixture to the gypsum board.

TABLE 2

| Example No. | Abrasion in g | Adhesion joint tape, "Kurt" in g | Adhesion paper tape in g | adhesive tensile strength in N/mm$^2$ |
|---|---|---|---|---|
| V0 | 3.56 | 424 | 369 | 0.30 |
| V 0-1 | 3.46 | 524 | 314 | 0.34 |
| V 0-2 | 3.30 | 510 | 308 | 0.34 |
| V1 | 3.74 | 474 | 236 | 0.29 |
| V 1-1 | 3.14 | 545 | 362 | 0.33 |
| V 1-2 | 3.09 | 563 | 339 | 0.35 |
| V 2 | 2.76 | 730 | 1015 | 0.28 |
| V 2-1 | 2.52 | 917 | 1359 | 0.39 |
| V 2-2 | 2.37 | 867 | 1332 | 0.38 |

The inventive compositions show at least equal, but mostly enhanced properties compared to the respective comparison examples. Especially surprising are the very small amounts of etherified starch, which are enough to generate rather big effects in combination with starch as binder.

The invention claimed is:

1. A mortar, comprising a composition comprising one or more fillers, one or more binders, one or more thickeners and optionally further additives, wherein at least one of the one or more binders is a starch, wherein the starch is selected from the group consisting of modified native starch, pregelatinized starch, extruded starch, spray-cooked starch, spray-dried starch, drum-dried starch, cold-water-soluble starch, cold-water-swellable starch, annealed starch, oxidized starch, crosslinked starch, and esterified starch, and wherein at least one of the one or more thickeners is an etherified starch, wherein the mortar is in powder form, wherein the starch is present in an amount between more than 0.5% by weight and less than 7% by weight of the total composition, and wherein the etherified starch is present in an amount between more than 0.01% by weight and less than 5% by weight of the total composition.

2. The mortar according to claim 1, wherein the starch is selected from the group consisting of modified native potato starch, modified native wheat starch, modified native rice starch, modified native corn starch, modified native tapioca starch, modified native pea starch and any combinations thereof.

3. The mortar according to claim 1, wherein the starch is present in an amount between more than 0.7% by weight and less than 3% by weight of the total composition.

4. The mortar according to claim 1, wherein the starch is a native, pregelatinized starch, an oxidized starch, a pregelatinized starch, a native, pregelatinized wheat starch, a native, pregelatinized, cold-water-swellable starch, an oxidized, cold-water-swellable wheat starch, or a pregelatinized, cold-water-swellable wheat starch.

5. The mortar according to claim 1, wherein the starch comprises one or more polysaccharides having an average molecular weight Mw of between 15,000 g/mol and 200,000 g/mol.

6. The mortar according to claim 1, wherein the one or more fillers are selected from the group consisting of calcium carbonates, calcium magnesium carbonates, calcium sulfates, perlite, expanded perlite, magnesium carbonate, glass, mica and resin microbeads, or any combination thereof.

7. The mortar according to claim 1, wherein the etherified starch is etherified with sodium-monochloroacetate or alkylene oxides with the general formula $C_nH_{2n}O$, where n=2 to 5.

8. The mortar according to claim 1, wherein the etherified starch is selected from the group consisting of potato etherified starch, wheat etherified starch, rice etherified starch, corn etherified starch, tapioca etherified starch, pea etherified starch and any combinations thereof.

9. The mortar according to claim 8, wherein the etherified starch is selected from the group consisting of wheat etherified starch, potato etherified starch and combinations thereof.

10. The mortar according to claim 1, wherein the etherified starch is a pregelatinized etherified starch.

11. The mortar according to claim 1, wherein the etherified starch is present in the composition in an amount between more than 0.04% by weight and less than 2% by weight of the total composition.

12. The mortar according to claim 1, wherein the composition comprises at least two thickeners, wherein the at least two thickeners are an etherified starch and a further thickener selected from the group consisting of cellulosic ether, cellulose-based gum, dextran, carboxymethyl dextran, dextran-sulfonate salt, chitosan, xanthan gum, carrageenan, polyacrylamide, polyacrylamide copolymer, ethylene maleic anhydride copolymer, polyvinyl alcohol copolymers or crosslinked polyethylene oxide and esterified starch.

13. The mortar according to claim 12, wherein the cellulosic ether comprises methyl cellulose, hydroxyethyl cellulose, hydroxyethylmethyl cellulose, carboxymethyl cellulose or a salt thereof, hydroxyethyl hydroxypropyl cellulose, ethyl hydroxyethyl cellulose, hydroxypropylmethyl cellulose, methylhydroxylpropyl cellulose, or crosslinked carboxymethylcellulose.

14. The mortar according to claim 1, wherein the composition comprises at least three thickeners, wherein the at least three thickeners are an etherified starch and two further thickeners selected from the group consisting of one or more cellulosic ether, cellulose-based gum, dextran, carboxymethyl dextran, dextran-sulfonate salt, chitosan, xanthan gum, carrageenan, polyacrylamide, polyacrylamide copolymer, ethylene maleic anhydride copolymer, polyvinyl alcohol copolymers, crosslinked polyethylene oxide and esterified starch.

15. The mortar according to claim 1, wherein the composition comprises at least two binders, wherein the at least two binders are the starch and a further binder, wherein the further binder is a mineral binder or an organic binder.

16. The mortar according to claim 1, wherein the composition comprises at least two binders, wherein the at least two binders are the starch and a further organic binder selected from the group consisting of a further starch, polyvinyl acetate, polyethylene vinyl acetate, polyacrylate and polyvinyl alcohol.

17. The mortar according to claim 1, wherein the composition consists of the one or more fillers, the starch, the etherified starch and a cellulosic ether and optionally a dispersion powder and/or polyacrylamide.

18. The mortar according to claim 1, wherein the etherified starch is selected from the group consisting of pregelatinized etherified starch, extruded etherified starch, spray-cooked etherified starch, spray-dried etherified starch, drum-dried etherified starch, cold-water-soluble etherified starch, cold-water-swellable etherified starch, annealed etherified starch, oxidized etherified starch, crosslinked etherified starch, and esterified etherified starch.

19. A method of using a starch in combination with starch ether comprising the step of adding the starch and the starch ether in a powder mortar, wherein the starch is selected from the group consisting of modified native starch, pregelatinized starch, extruded starch, spray-cooked starch, spray-dried starch, drum-dried starch, cold-water-soluble starch, cold-water-swellable starch, annealed starch, oxidized starch, crosslinked starch, and esterified starch, and wherein the starch is present in an amount between more than 0.5% by weight and less than 7% by weight of the powder mortar, and wherein the starch ether is present in an amount between more than 0.01% by weight and less than 5% by weight of the powder mortar.

20. A spackling compound comprising the mortar according to claim 1 and water.

* * * * *